(12) United States Patent
Paton

(10) Patent No.: US 7,190,126 B1
(45) Date of Patent: Mar. 13, 2007

(54) DAYLIGHT CONTROL SYSTEM DEVICE AND METHOD

(75) Inventor: John Douglas Paton, Oakland, CA (US)

(73) Assignee: Watt Stopper, Inc., Santa Clara, CA (US)

(*) Notice: Subject to any disclaimer, the term of this patent is extended or adjusted under 35 U.S.C. 154(b) by 0 days.

(21) Appl. No.: 10/925,455

(22) Filed: Aug. 24, 2004

(51) Int. Cl.
*G05F 1/00* (2006.01)

(52) U.S. Cl. ............................ 315/308; 315/312

(58) Field of Classification Search ................ 315/291, 315/294, 295, 308; 362/276; 340/531, 506
See application file for complete search history.

(56) References Cited

U.S. PATENT DOCUMENTS

| | | | |
|---|---|---|---|
| 3,912,866 A | 10/1975 | Fox | 179/1 E |
| 3,993,569 A | 11/1976 | Zinsmeyer et al. | 250/209 |
| 4,021,679 A | 5/1977 | Bolle et al. | 307/117 |
| 4,093,943 A | 6/1978 | Knight | 340/220 |
| 4,107,659 A | 8/1978 | Massa | 340/552 |
| 4,233,545 A | 11/1980 | Webster et al. | 250/214 AL |
| 4,330,706 A | 5/1982 | Lawenhaupt | 250/214 AL |
| 4,367,414 A * | 1/1983 | Miller et al. | 307/38 |
| 4,458,170 A | 7/1984 | Takayama et al. | 310/322 |
| 4,511,895 A * | 4/1985 | Miller et al. | 340/825.5 |
| 4,607,186 A | 8/1986 | Takayama et al. | 310/324 |
| 4,628,496 A | 12/1986 | Lee | 367/93 |
| 4,695,769 A | 9/1987 | Schweickardt | 315/158 |
| 4,751,623 A | 6/1988 | Gaines et al. | 362/276 |
| 4,757,430 A | 7/1988 | Dubak et al. | 362/100 |
| 4,820,938 A | 4/1989 | Mix et al. | 307/117 |
| 4,914,859 A | 4/1990 | Gionet et al. | 49/25 |
| 5,015,994 A | 5/1991 | Hoberman et al. | 340/567 |
| 5,185,728 A | 2/1993 | Gilchrist | 367/163 |
| 5,189,393 A | 2/1993 | Hu | 340/522 |
| 5,251,188 A | 10/1993 | Parsons et al. | 367/140 |
| 5,307,051 A | 4/1994 | Sedlmayr | 340/573 |
| 5,386,210 A | 1/1995 | Lee | 340/567 |
| 5,442,177 A | 8/1995 | Boulos et al. | 250/342 |
| 5,489,827 A | 2/1996 | Xia | 315/294 |
| 5,495,402 A | 2/1996 | Houssian | 362/226 |
| 5,495,766 A | 3/1996 | Kota et al. | 73/652 |
| 5,621,662 A | 4/1997 | Humphries et al. | 364/550 |
| 5,638,824 A | 6/1997 | Summers | 128/721 |

(Continued)

OTHER PUBLICATIONS

Vishay, Vishay Telefunken, "Physics of Optoelectronic Devices Light-Emitting Diodes," Dec. 1999, pp. 1-7.

(Continued)

*Primary Examiner*—Thuy V. Tran
*Assistant Examiner*—Tung Le
(74) *Attorney, Agent, or Firm*—Haverstock & Owens LLP

(57) ABSTRACT

A system and device for and a method of programming and controlling light fixtures is disclosed. A system in accordance with the present invention includes a stationary controller unit that is electrically coupled to the light fixtures. The stationary controller unit is configured to be remotely programmed with a portable commissioning device to automatically control the lights fixtures. The stationary controller unit and the portable commissioning device include light sensors, micro-computers and transceivers for measuring light levels, running programs, storing data and transmitting data between the stationary controller unit and the portable commissioning device. In operation, target light levels selected with the portable commissioning device and the controller unit is remotely programmed to automatically maintain the target level.

20 Claims, 7 Drawing Sheets

U.S. PATENT DOCUMENTS

| | | | |
|---|---|---|---|
| 5,640,143 A | 6/1997 | Myron et al. | 340/541 |
| 5,652,567 A | 7/1997 | Traxler | 340/552 |
| 5,699,243 A * | 12/1997 | Eckel et al. | 700/17 |
| 5,701,058 A | 12/1997 | Roth | 315/158 |
| 5,713,655 A | 2/1998 | Blackman | 362/95 |
| D393,912 S | 4/1998 | Yuen | D26/26 |
| 5,763,872 A | 6/1998 | Ness | 250/214 AL |
| 5,867,099 A | 2/1999 | Keeter | 340/567 |
| D409,317 S | 5/1999 | Yuen | D26/26 |
| 5,932,861 A | 8/1999 | Iwaguchi et al. | 235/455 |
| 5,946,209 A | 8/1999 | Eckel et al. | 364/143 |
| 5,962,989 A * | 10/1999 | Baker | 315/294 |
| 5,984,513 A | 11/1999 | Baldwin | 364/528.21 |
| 6,034,581 A | 3/2000 | DiMarco et al. | 335/16 |
| 6,051,787 A | 4/2000 | Rintz | 174/66 |
| D425,222 S | 5/2000 | Yuen | D26/26 |
| D425,638 S | 5/2000 | Yuen | D26/26 |
| 6,084,231 A | 7/2000 | Popat | 250/214 AL |
| 6,087,588 A | 7/2000 | Soules | 174/66 |
| 6,087,760 A | 7/2000 | Yamaguchi et al. | 310/334 |
| 6,121,875 A | 9/2000 | Hamm et al. | 340/540 |
| D431,660 S | 10/2000 | Yuen | D26/26 |
| 6,132,057 A | 10/2000 | Williams | 362/100 |
| 6,151,529 A | 11/2000 | Batko | 700/28 |
| 6,172,301 B1 | 1/2001 | Goodsell | 174/66 |
| RE37,135 E | 4/2001 | Elwell | 315/154 |
| 6,297,724 B1 | 10/2001 | Bryans et al. | 340/3.51 |
| 6,337,541 B1 | 1/2002 | Dickie et al. | 315/169.3 |
| 6,343,134 B1 | 1/2002 | Czerwinski | 381/342 |
| 6,390,647 B1 | 5/2002 | Shaefer | 362/276 |
| 6,466,826 B1 | 10/2002 | Nishihira et al. | 700/17 |
| 6,548,967 B1 * | 4/2003 | Dowling et al. | 315/318 |
| 6,566,882 B2 | 5/2003 | Baldwin et al. | 324/418 |
| 6,583,573 B2 | 6/2003 | Bierman | 315/149 |
| 6,693,527 B2 | 2/2004 | Bone | 340/500 |
| 6,713,975 B2 | 3/2004 | Yamauchi et al. | 315/308 |
| 6,782,309 B2 | 8/2004 | Laflamme et al. | 700/275 |
| 6,894,609 B2 * | 5/2005 | Menard et al. | 340/531 |
| 6,965,205 B2 * | 11/2005 | Piepgras et al. | 315/318 |
| 7,024,256 B2 | 4/2006 | Krzyzanowski et al. | 700/65 |
| 7,027,878 B2 | 4/2006 | Bennett | 700/14 |
| 7,099,723 B2 | 8/2006 | Gonzales et al. | 700/87 |
| 7,122,976 B1 | 10/2006 | Null et al. | 315/362 |
| 2002/0047774 A1 | 4/2002 | Christensen et al. | 340/3.54 |
| 2002/0060283 A1 | 5/2002 | Jordan et al. | 250/205 |
| 2002/0134909 A1 | 9/2002 | Shiota et al. | 250/205 |
| 2003/0001577 A1 * | 1/2003 | Baldwin et al. | 324/418 |
| 2003/0050737 A1 | 3/2003 | Osann, Jr. | 700/276 |
| 2004/0003051 A1 | 1/2004 | Krzyzanowski et al. | 709/217 |
| 2004/0160199 A1 * | 8/2004 | Morgan et al. | 315/312 |
| 2004/0260407 A1 | 12/2004 | Wimsatt | 700/19 |
| 2004/0260427 A1 | 12/2004 | Wimsatt | 700/275 |
| 2005/0097162 A1 | 5/2005 | Budike, Jr. | 709/201 |
| 2005/0105296 A1 | 5/2005 | French | 362/485 |
| 2005/0116667 A1 * | 6/2005 | Mueller et al. | 315/312 |
| 2005/0128751 A1 * | 6/2005 | Roberge et al. | 362/276 |
| 2005/0138142 A1 | 6/2005 | Crookham et al. | 709/217 |
| 2005/0280388 A1 | 12/2005 | Evanyk | 318/471 |
| 2006/0166620 A1 | 7/2006 | Sorenson | 455/41.1 |
| 2006/0197471 A1 * | 9/2006 | Chitta | 315/291 |
| 2006/0213997 A1 | 9/2006 | Frank et al. | 235/462.15 |
| 2006/0230270 A1 | 10/2006 | Goffin | 713/173 |

OTHER PUBLICATIONS

Vishay, Vishay Telefunken, "Measuring Technique," Dec. 1999, pp. 1-9.

Asian Technology Information Program (ATIP), "Blue LED's: Breakthroughs and Implications," ATIP Report ATIP95.59, Aug. 27, 1995, See www.cs.arizona.edu/japan/atip/public/atip.reports.95/atip95.59r.html.

Energy User News, "The Coming Revolution in Lighting Practice," by Sam Berman, Oct. 2000, pp. 24-26.

IESNA Paper #59, "Characterizing Daylight Photosensor System Performance to Help Overcome Market Barriers," by Andrew Bierman et al., no date.

Journal of the Illuminating Engineering Society, "Improving the Performance of Photo-Electrically Controlled Lighting Systems," by Francis Rubinstein et al., Winter 1989, pp. 70-94.

Specifier Reports, "Photosensors- Lightsensing devices that control output form electric lighting systems", National Light Product Information Program, vol. 6 No. 1, Mar. 1998, p. 1 of 20.

"Si Photodiode—S7686", Hamamatsu, pp. 1, no date.

"Si Photodiodes—S6626, S6838", Hamamatsu, pp. 1-2, Feb. 1997.

"Si Photodiodes—S7160, S7160-01", Hamamatsu, pp. 1-2, Jul. 1997.

* cited by examiner

DAYLIGHT CONTROL SYSTEM DEVICE AND METHOD

GOVERNMENT FUNDING

This invention was developed under Contact No. 500-01-041 with the California Energy Commission. The Government may have certain rights to this invention.

FIELD OF THE INVENTION

This invention relates to light management systems, devices and methods. More particularly, the invention relates to a system and device for and a method of remotely programming and controlling room lights.

BACKGROUND OF THE INVENTION

Because of rising energy costs and negative environmental impacts of energy usage and energy generation, there is a continual effort to reduce energy consumption of lighting fixtures, especially in large public and private building. A number of different light management systems have been developed to help reduce power consumption. One type of light management system utilizes motion detectors or sensors that shut light fixtures on and off based on detected motion. Other light management systems use light sensors, whereby light output levels from light fixtures are automatically adjusted based on detected levels of light. There are still a number of shortcomings with currently available light management systems and problems with integrating lighting equipment from different light management systems.

To ensure that the manufactures of lighting equipment, installers of the lighting equipment and the end users of the lighting equipment make, install and use the lighting equipment to meet the lighting requirements of the environment while operating as efficiently as possible, energy regulators require product documentation as well as on-site operational or performance data of the lighting equipment. Typically, the on-site operational or performance data requires that the light output from each of the light fixtures installed are individually measured and documented to generate what is referred to herein as a commissioning report. In large office buildings with thousands of light fixtures, generating a commissioning report is extremely time consuming and labor intensive.

With the complexity of modern light management systems and the continued pressures to reduce energy consumption, there is a continued need to find improved systems and devices for and methods of integration of light management equipment that also provide operational or performance data to show that light fixtures are operating effectively and efficiently.

SUMMARY OF THE INVENTION

The present invention is directed to a device and a system for controlling lights in response to a secondary light source, such as daylight. The present invention provides a user friendly device and system for and method of commissioning lighting control zone. Lighting control zones can include a large number of light fixtures, such as are typically found in large public and private buildings. The device, system and method of the present invention also provide a reliable and simple way to provide performance data, history data and set-up data, also referred to as operating data, for the lighting control zones.

In accordance with the embodiments of the invention, a stationary controller unit includes a light sensor and a communication means. The stationary controller unit is configured to control lights to operate at target output levels. The stationary controller unit is also referred to herein as a controller unit and it is understood that the controller unit is stationary. In accordance with a preferred embodiment of the invention, the controller unit is configured to be programmed with a portable commissioning device, as described in detail below. The portable commissioning device is also referred to as a commissioning device and it is understood that the commissioning device is portable.

In accordance with the embodiments of the invention, the commissioning device also includes a light sensor measuring illumination and a communication means, such that the controller unit and the commissioning device can participate in two-way commination to transfer operational data from the controller unit to the commissioning device and remotely run commissioning programs and calibration programs on the controller unit from the commissioning device, as described below. The commissioning device is preferably powered with a portable energy source, such as a battery, a solar cell or a combination thereof. Where the commissioning device is powered with the battery, the commissioning device can include electrical contacts and/or connectors to electrically couple to a battery charger.

To commission light fixtures, a target light level is selected from the commissioning device through a user interface and the commissioning device instructs the controller unit to run a commissioning program. The user interface can include any number of input mechanisms and displays including, but not limited to, buttons, knobs, lights and screens. Preferably, the user interface includes buttons and an LED screen for selecting input values and for migrating through menus and/or programs.

The target light level that is selected from the commissioning device is preferably based on the lighting requirements for the environment being commissioned, which can include light levels required or suggested for offices, schools and the like by federal, state or local governments. In order to program the controller unit to maintain the selected target light level, room light of the area being commissioned is measured using the light sensor of the commissioning device, also referred to as the commissioning device light sensor. Preferably, the room light is measured in a work plane (i.e. between 2 to 4 feet from the floor of the room), where occupants generally work or most often experience the lighting conditions of the room. The room light that is measured includes natural room light (light from windows and/or outdoors), light that floods into the room from adjacent rooms, as well as light that is emitted from the light fixtures being commissioned.

After the room light is measured, the controller unit varies a control signal applied to the light fixtures to adjust the light outputs from the light fixtures to meet the selected target light level. The light sensor from the controller unit, also referred to as the controller unit light sensor, is then programmed or set to adjust the control signal applied to the light fixtures to adjust light output levels to maintain the selected target light. For example, when the room becomes exposed to more natural light, the controller unit will vary a control signal applied to the light fixtures to automatically decrease the light outputs from the light fixtures, such that the light level at the task level and as measured by the controller unit light sensor remains substantially constant.

Conversely, as the room is exposed to less natural light, the controller unit will vary the control signals applied to the light fixtures to automatically increase the light outputs from the light fixtures to maintain the target light level in the room. The controller unit and the commissioning device light sensors are preferably photodiodes light sensors that include filters to match a photopic response curve (response to day light as perceived by the human eye). These light sensors are typically sensitive to a spectrum of light that includes light having wavelengths in a range of 380 to 750 nanometers. The light sensor that is used in the control unit preferably has a response that is less than a cosine corrected response.

The controller unit and the commissioning device both preferably include micro-processors with sufficient logic circuitry and memory to store, run and execute programs and store operational data, such as described below.

As described above, the controller unit and the commissioning device preferably participate in two-way communication to run programs, such as the commissioning program described above and a calibration program, such as described below. Further, two-way communication allows the controller unit and the commissioning device to exchange performance data, history data and set-up data, all of which can be used to generate commissioning reports. Commissioning reports can be used to provide documentation to a building authority and/or energy commission that the light fixtures are operating to provide sufficient light levels for the occupants and are operating at sufficiently low energy consumption levels.

Preferably, two-way communication between the controller unit and the commissioning device is wireless and uses infrared transceivers. Alternatively, two-way communication between the controller unit and the commissioning device is wireless and uses radio transceivers. Preferably, the commissioning device is configured with means to download data to a personal computer, data such as light fixture identification numbers and locations, light fixture set up parameters and/or operation history. The means to download is an infrared transmitter, a USB connection, or any other suitable networking connection. Accordingly, the commissioning report can be formatted and printed from the personal computer.

Many of the light fixtures in office, manufacturing and educational environments use ballasts and flourescent light bulbs, generally referred to herein as flourescent light fixtures. Fluorescent light fixtures do not have linear or uniform output responses to voltages applied. Accordingly, programming the controller unit to maintain a group of fluorescent light fixtures using a single voltage response or profile in response to changes in detected light levels can result in inefficient operation of the fluorescent light fixtures as well as uneven lighting throughout the work-space. To address this problem, the commissioning device of the present invention is preferably configured to run a calibration program from the controller unit to calibrate a "dimming response" for the fluorescent light fixtures. The controller unit can then be programmed to maintain the fluorescent light fixture outputs in accordance with a calibrated or corrected dimming response.

To determine a dimming response for fluorescent light fixtures or a group of fluorescent light fixtures, the commissioning device instructs the controller unit by the wireless means running the calibration program. During the calibration process or during the execution of a calibration program, the controller unit places the fluorescent light fixture or group of fluorescent light fixtures at full power output. Then the fluorescent light fixture or group of fluorescent lights is switched on and off as well as dimmed through a range of reduced applied voltages, referred to herein as a dimming sequence. While running the dimming sequence, light outputs generated from the fluorescent light fixture or group of fluorescent light fixtures is measured using one or more of the controller unit and commissioning device light sensors. From the measured light outputs through the range of applied voltages, a dimming response is calculated. From the calculated dimming responses of the flourescent light fixture or group of fluorescent light fixtures, the controller unit is programmed to maintain the light output from the fluorescent light fixture or group of fluorescent light fixtures with a correction algorithm or compensation factor to account for any response discrepancies measured against a standard or ideal dimming response. Accordingly, all of the fluorescent light fixtures or groups of fluorescent light fixtures commissioned in a work-space will maintain the target light levels, while exhibiting a consistent dimming response to provide efficient and uniform lighting throughout the work space.

In accordance with the system of the present invention, a controller unit is configured to control, operate and maintain a group of light fixtures. The controller unit can be programmed to control, operate and maintain the entire group of light fixtures according to single set of parameters or, alternatively, control, operate or maintain sub-groups of the group of light fixtures according to a separate or unique set of parameters. The controller unit adjusts the light outputs of the controlled lights using control signals. Control signals can include, but not limited to, DC voltage control signals, digital control signals and radio or wireless control signals. The system of the present invention also preferably includes a power pack that includes a relay switch that is rated for high voltage operation and that is used to switch the controlled lights on and off. The system of the present invention also preferably includes one or more motion detectors or occupancy sensors for operating light fixtures within the group based on detected occupancy. In accordance with further embodiments of the invention, the system includes one or more manual switches for manually controlling light fixtures within the group of light fixtures. Devices, such as motion sensors or occupancy sensors and manual switches are referred to herein as override devices since they can override lighting programs running from the controller unit.

DETAILED DESCRIPTION OF THE INVENTION

The present invention is directed to a light management system that includes a portable commissioning device that correlates light sensor detection from a working plane with the commissioning device to the light sensor detection from a stationary controller unit, preferably mounted to a ceiling of a room. The system also provides for two-way communication between the commissioning device and the controller unit to automate the generation of commissioning reports. Further, the system provides for the ability to program the controller unit to operate the light fixtures with a corrected or calibrated dimming response and thus maintain preferred task illumination levels.

Figure 1:
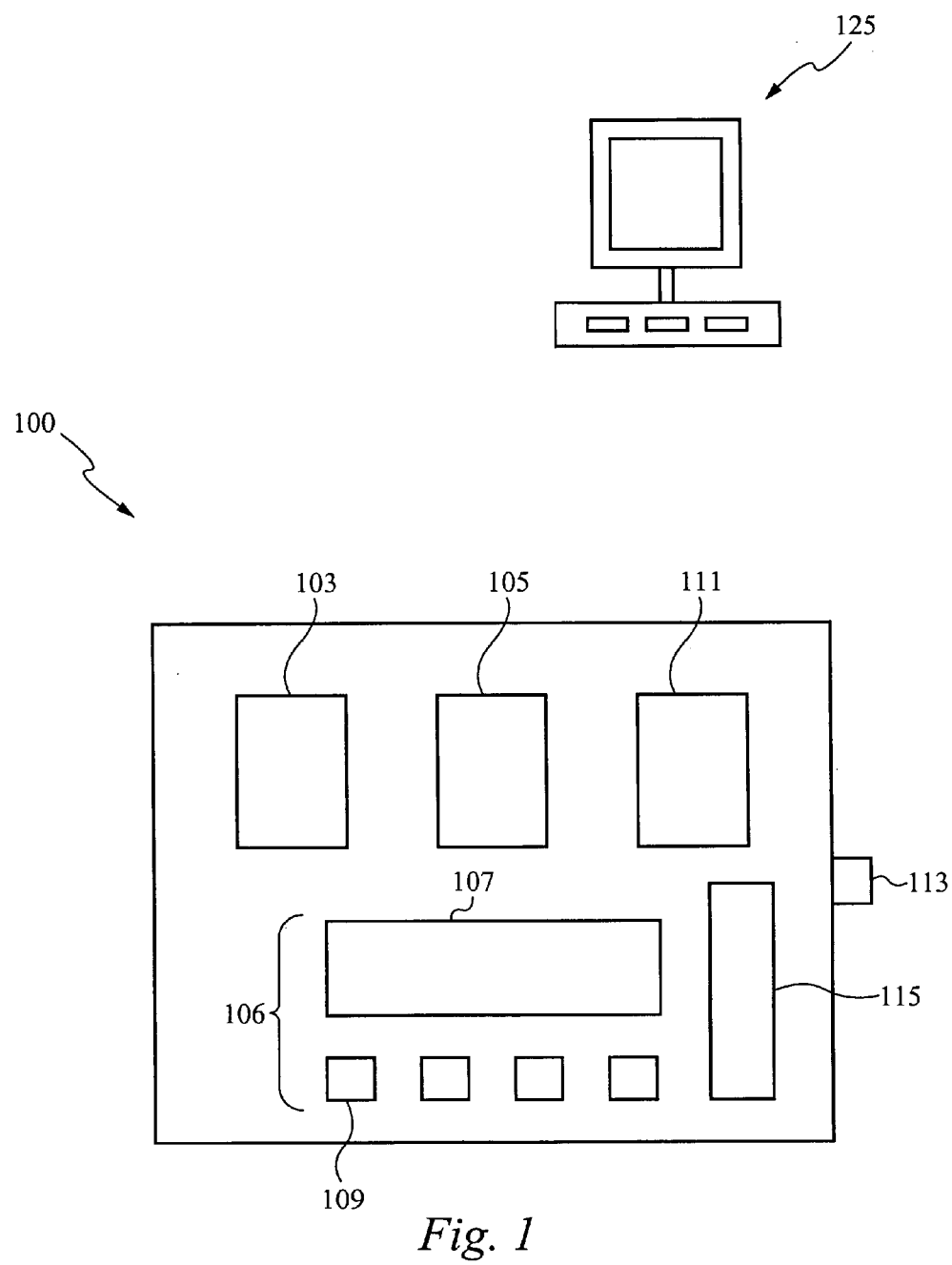
FIG. 1 shows a schematic representation of the commissioning device, in accordance with the embodiments of the invention.

FIG. 1 shows a schematic representation a portable commissioning device 100, in accordance with the embodiments of the invention. The commission device 100 is configured for commissioning light fixtures to provide a target light level. The commissioning device 100 includes a light sensor 103, a micro computer 105, a transceiver 115 and power portable power supply 111, such as a battery and/or solar cell. The light sensor 103 is preferably an LED light sensor. The transceiver 115 is preferably an infrared transceiver for providing two-way communication between the commissioning device and a controller unit, such as described with reference to FIG. 2 below.

Still referring to FIG. 1, the commissioning device 100 also includes a user interface 106 that can include buttons 109 and an LED screen 107 for selecting input values and for migrating through menus and/or programs that are stored on and run from the micro-computer 105. In accordance with a preferred embedment of the invention, the commissioning device 100 includes a connection 113 for downloading operational data to a personal computer 125 for generating commissioning reports therefrom. The connection 113 is an infrared transmitter, a USB connection or any other suitable networking connection.

Figure 2:
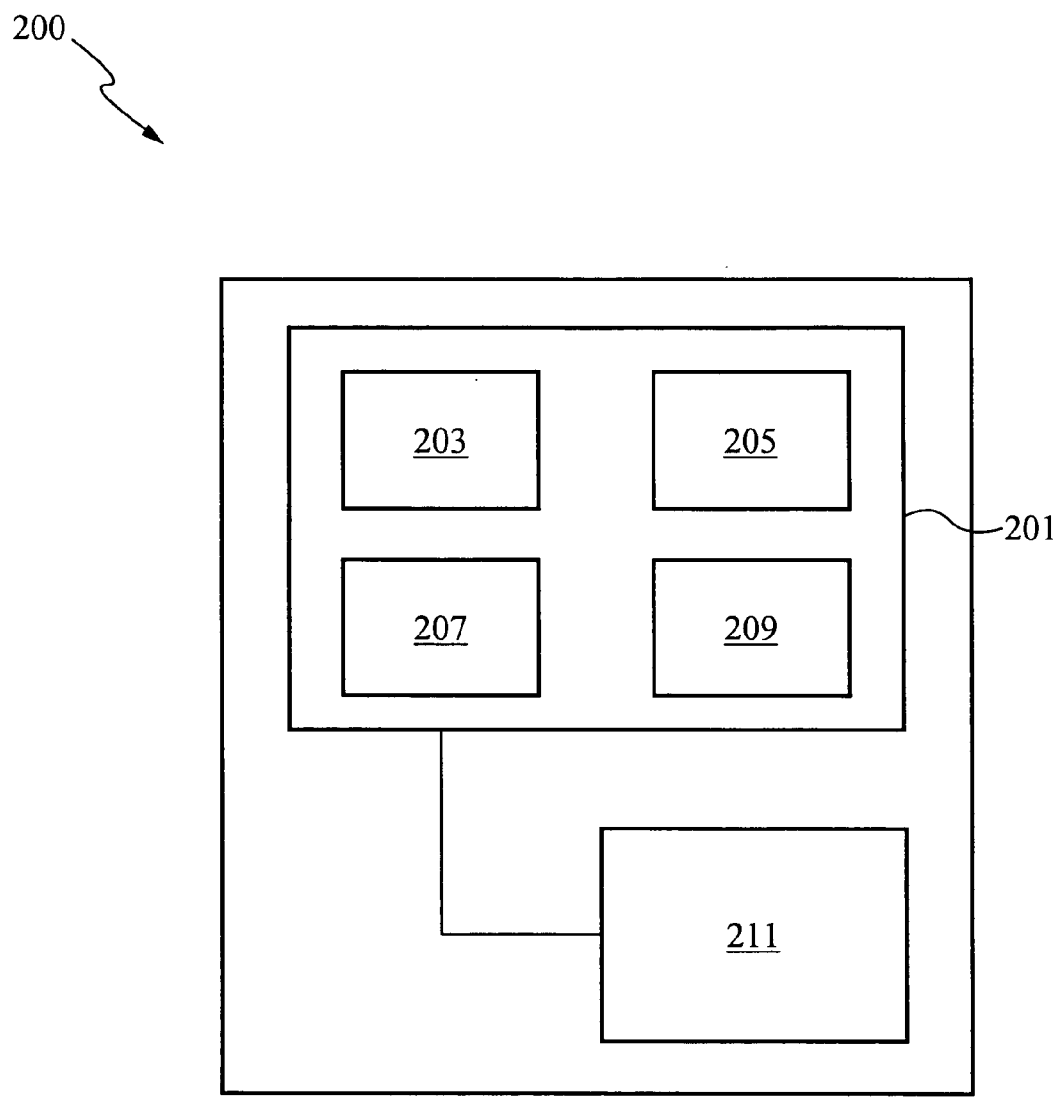
FIG. 2 shows a schematic representation of a portion of a light management system that includes a controller unit, in accordance with the embodiments of the invention.

FIG. 2 shows a schematic representation of a portion of a light control system 200, in accordance with the embodiments of the invention. The system 200 includes a controller unit 201 that is electrically coupled to at least one ballast 211 and is configured for controlling the control signal applied to a light source (not shown) through the ballast 211. The controller unit 201 includes a light sensor 203 for sensing and monitoring room light levels in the room.

Still referring to FIG. 2, the controller unit 201 also includes micro-computer 207 for running lighting programs, running commissioning programs and calibration programs, such as described above and below. The micro-computer 207 also stores operational data that can be transmitted to the commissioning device 100 (FIG. 1) by a compatible transceiver 205, that is preferably an infrared transceiver or, alternatively, a radio transceiver. Preferably, the controller unit 201 also includes a low-voltage power supply 209 for powering the light senor 203, the transceiver 205 and the micro-computer 207.

Figure 3:
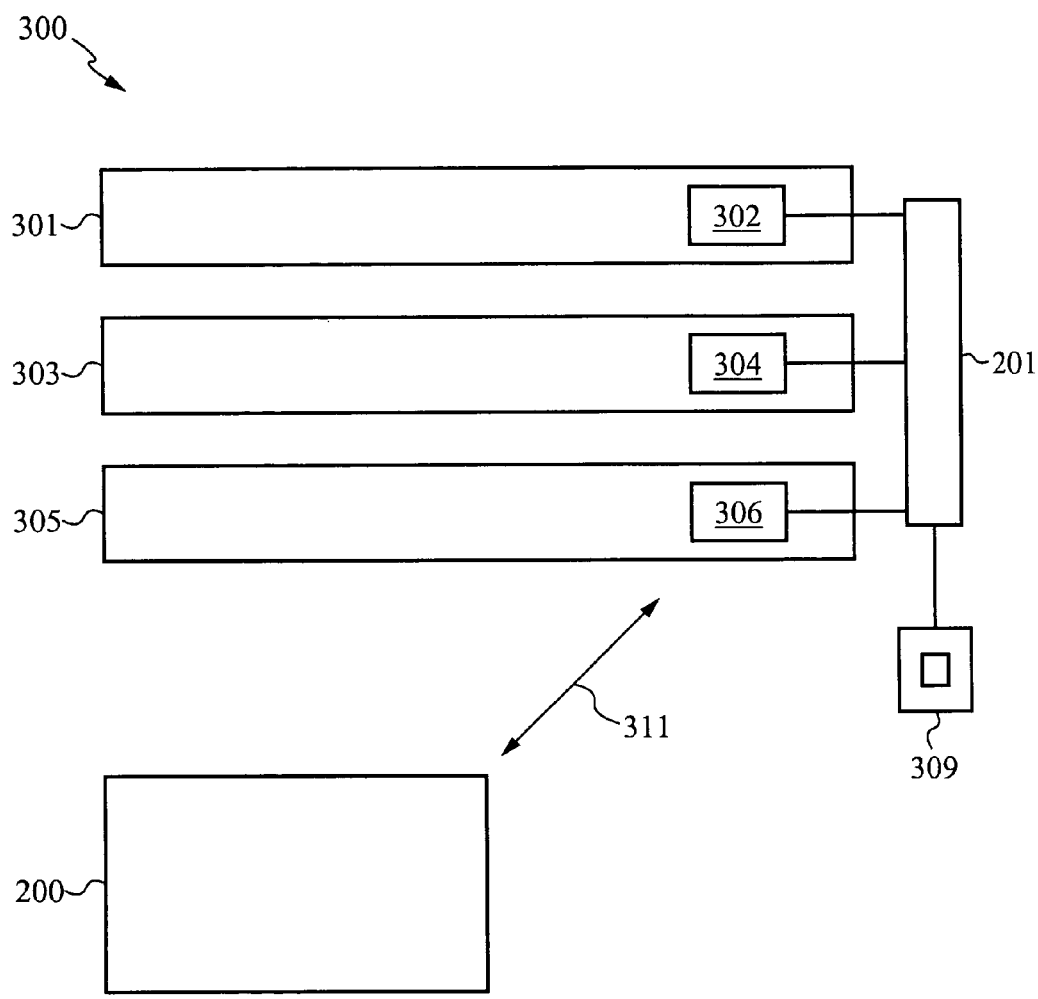
FIG. 3 shows a schematic representation of system, in accordance with the embodiments of the invention.

FIG. 3 is a schematic representation of system 300, in accordance with the embodiments of the invention. The system 300 includes a portable commissioning device 200, such as described above with reference to FIG. 1. The system 300 also includes a controller unit 201, such as described above with reference to FIG. 2. The controller unit 201 is electrically coupled to a plurality of ballasts 302, 304 and 306 for controlling the control signal applied to a corresponding plurality of fluorescent light fixtures 301, 303 and 305. The controller unit 201 and the commissioning device 200 are configured to provide two-way communication between each other, as indicated by arrow 311, using transceivers (not shown). The two-way communication between the controller unit 201 and the commissioning device 200 allows programs to be executed on the controller unit 201 from the commissioning device 200 and also allows the transmission of operational data from the controller unit 201 to the commissioning device 200 that can then be used to generate a commissioning report.

In accordance with further embodiments of the invention, the system 300 includes one or more override devices 309 that can override or interrupt lighting programs running from the controller unit 201 and directly operate the fluorescent lights 301, 303 and 305. The one or more override devices 309 can include a dimmer switch and a motion sensor or occupancy sensor, such as described below with reference to FIGS. 4 and 5.

Figure 4:
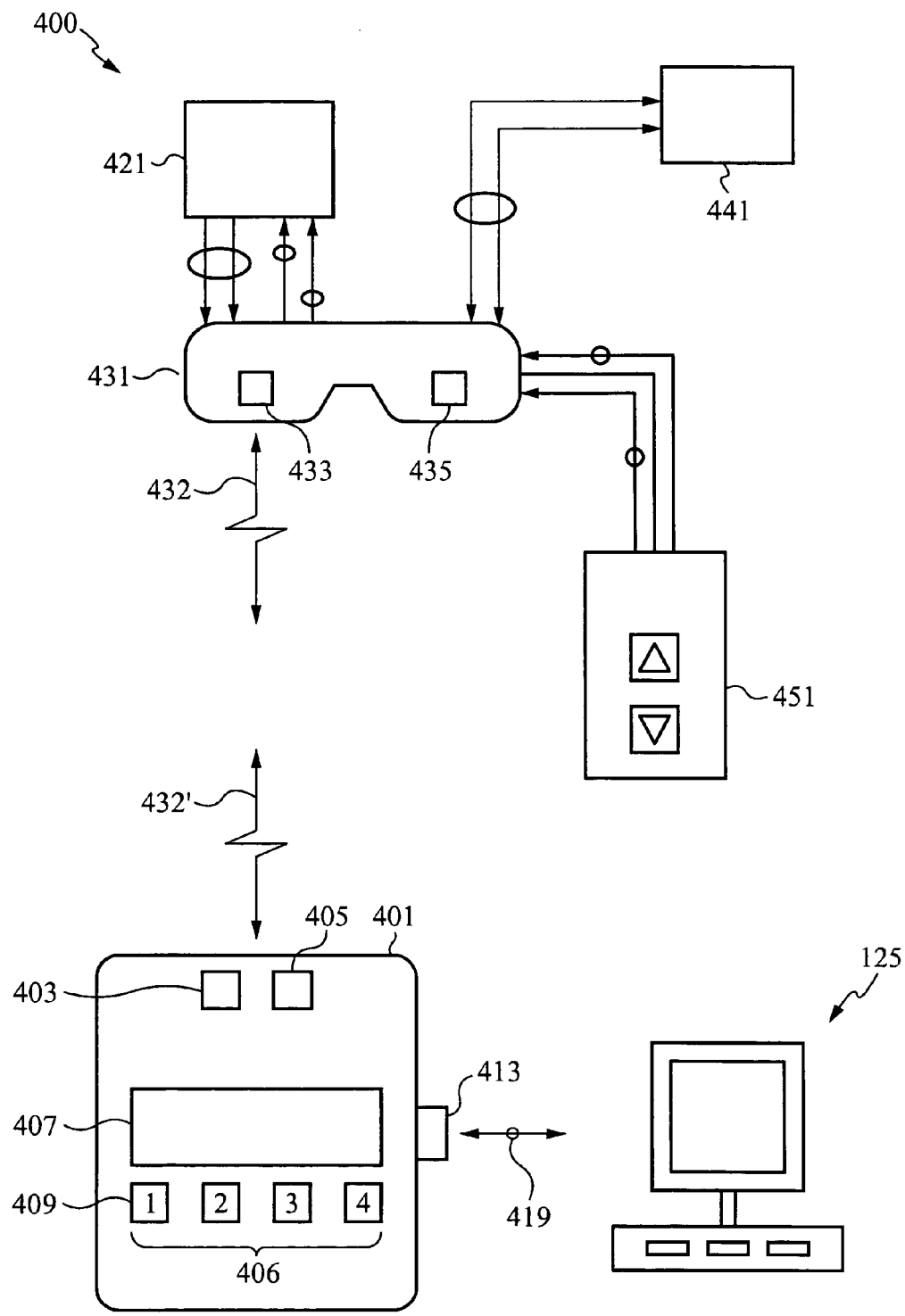
FIG. 4 shows a detailed schematic representation of a light managements system, in accordance with the embodiments of the invention.

FIG. 4 shows a detailed schematic of light management system 400, in accordance with the embodiments of the invention. The light management system 400 includes a controller unit 431 coupled to any number of light fixtures (not shown) through one or more ballasts 441. The controller unit 431 is preferably coupled to a low-voltage power source 421 for powering components of the controller unit 431, such as a light sensor 435, an infrared transceiver 433 and a micro-computer (not shown). The controller unit 431 is preferably electrically coupled to at least one wall switch 451 that can override a lighting program running on the controller unit 431 and directly control the control signal applied to the light fixtures through the ballasts 441.

Still referring to FIG. 4, the system 400 also includes a portable commissioning device 401 that is powered with a battery (not shown) and is configured to remotely program the controller unit 431 to regulate the light outputs according to a lighting program. The commissioning device 401 has a user interface 406 that includes a display 407 and buttons 409 for selecting input values and for migrating through menus and/or programs that are stored on the controller unit 431 and/or the commissioning device 401. The commissioning device 401 also preferably includes a USB port 413 for connecting to and downloading operational data to personal computer 125, as indicated by the arrow 419.

The commissioning device also includes a light sensor 403 for measuring room light and an infrared transceiver 405 for providing two-way communication between the commissioning device 401 and the controller unit 431, as indicated by the arrows 432 and 432' through the compatible infrared transceiver 433 of the controller unit 431.

Figure 5:
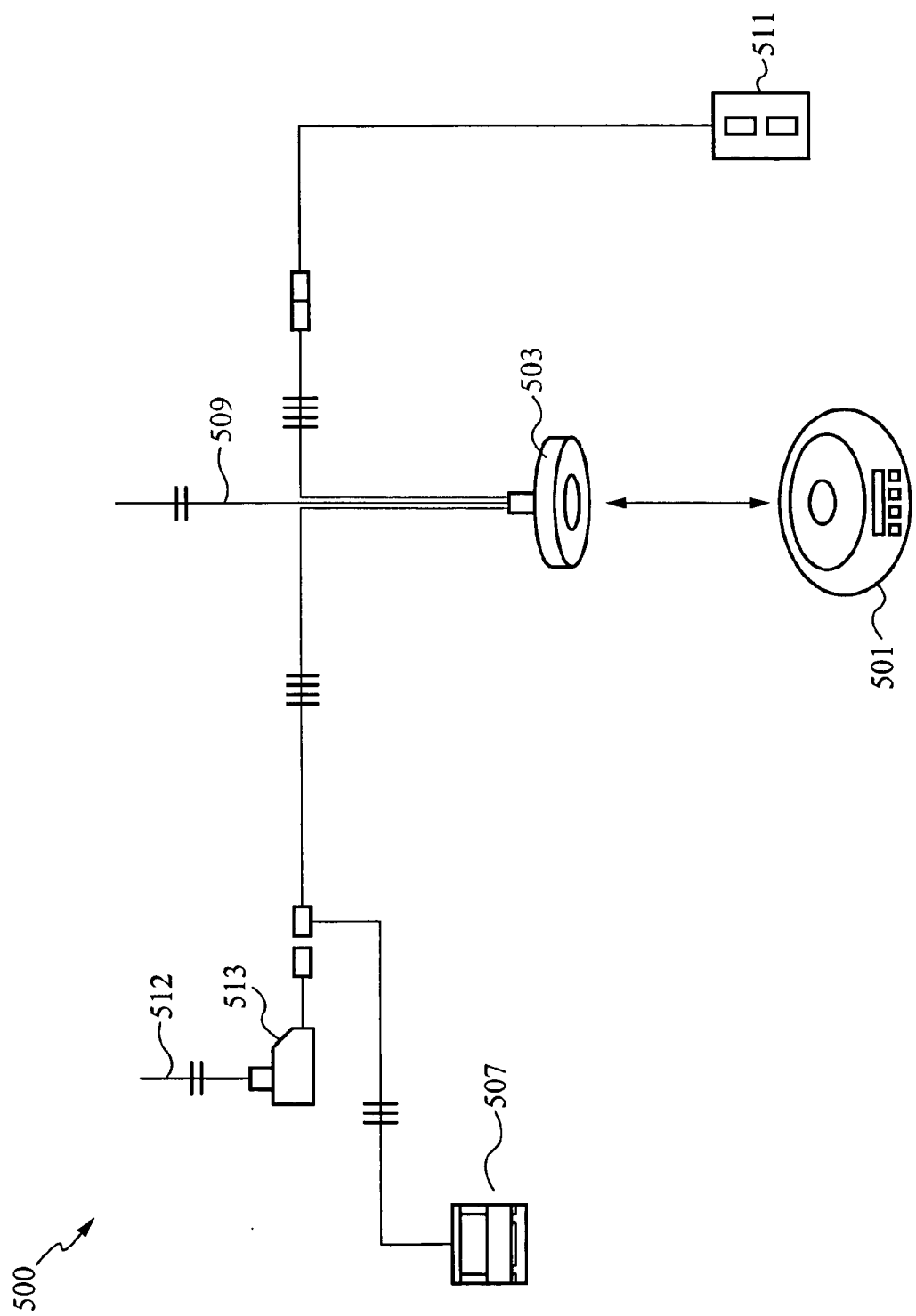
FIG. 5 shows a wiring schematic of a light management system that includes override devices, in accordance with the embodiments of the invention.

FIG. 5 shows a wiring schematic of a light management system 500 that includes override devices 507 and 511, in accordance with the embodiments of the invention. The system includes a portable commissioning device 501 and a stationary controller unit 503, such as described in detail above. The controller unit 503 is coupled to one or more ballasts through a power line 509 to adjust the control signal applied to light fixtures through the one or more ballasts. The controller unit 503 is also electrically coupled to a power-pack 513 that is connected to a power line 512. The power-pack 513 is configured to provide low-voltage power to the controller unit 503 and the override sensor 507 that is preferably an occupancy sensor or a motion sensor. The power-pack 513 is configured to switch the controlled light on and off with a relay switch rated for high voltage use. The system also preferably includes a dimmer switch 511 that is electrically coupled to the controller unit 503 for adjusting the control signal applied to the light fixtures.

Figure 6A:
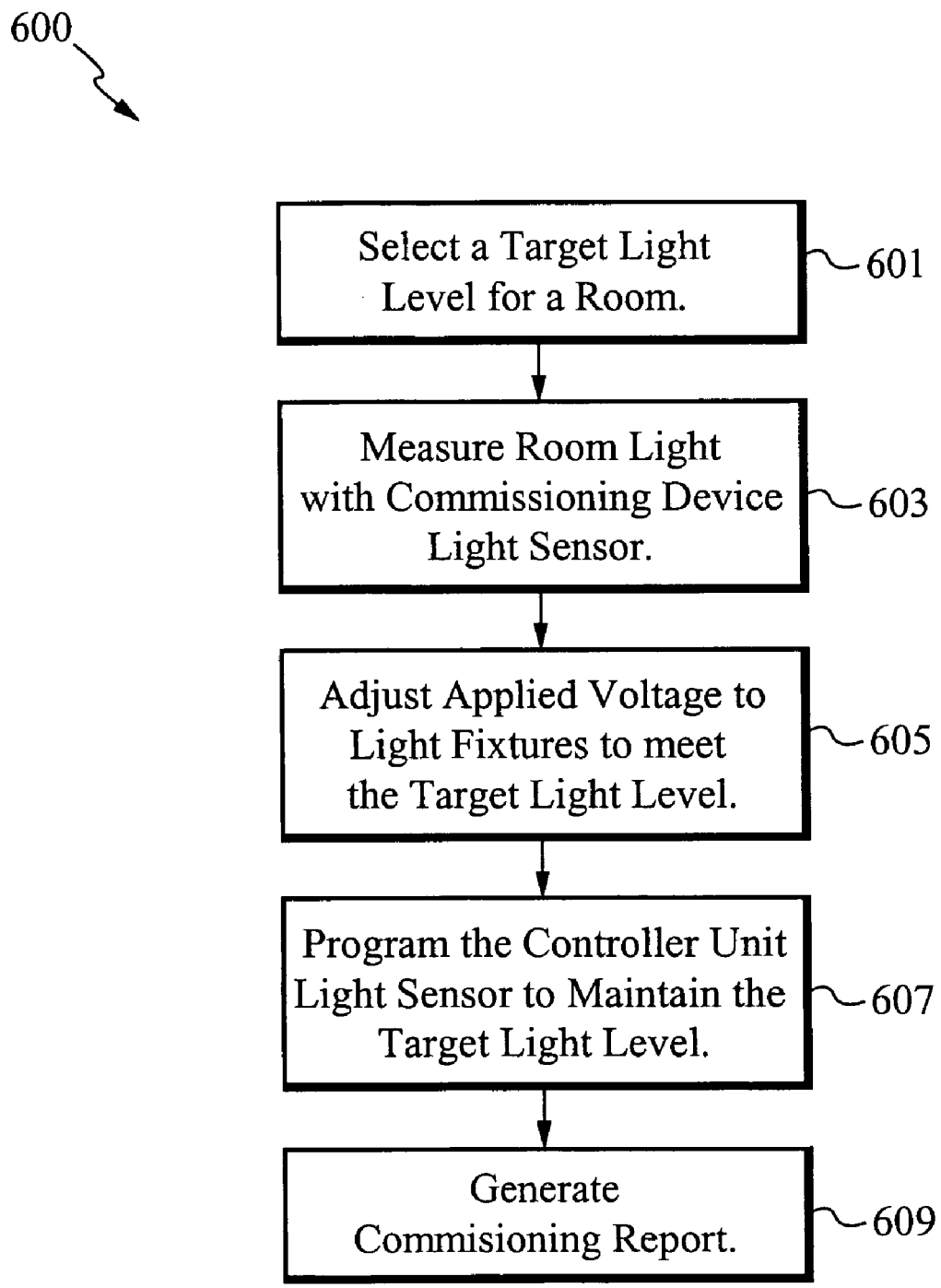
FIGS. 6A–B are block flow diagrams outlining steps for commissioning light fixtures and for calibrating light fixture dimming responses, in accordance with the a method of the present invention.

FIG. 6A is a flow diagram 600 outlining steps for commissioning light fixtures, in accordance with the method of the present invention. In the step 601, a target light level for a room is selected. Preferably, the target light level for the room is selected from a portable commissioning device that is running a commissioning program or a commissioning sequence. The target light level for the room is, for example, selected through a user interface on the commissioning device, such as described in detail above. After the target level of light is selected in the step 601, in the step 603 the room light is measured or monitored using a commissioning device light sensor. Preferably, the room light is measured or monitored in the step 603 at a work plane of the room, such as on a desk-top where the lighting requirements are most important for occupants of the room. While monitoring the room light in the step 603, in the step 605 a control signal that is applied to the light fixture or light fixtures is adjusted such that the output from the light fixture or light fixtures meets the target light level. After the light output from the light fixture or light fixture is adjusted to meet the target light level for the room in the step 605, in the step 607 the controller unit light sensor is programmed or set to automatically adjust the control signal applied to the light fixture or light fixtures in order to maintain the target light level for the room. Accordingly, when the room becomes exposed to more natural light, the controller unit will vary the voltage applied to the light fixture or light fixtures to automatically decrease the light output from the light fixture or light fixtures, such that the task illumination as measured by the controller unit light sensor remains substantially constant. If enough daylight is available, the controller unit can switch the controlled lights off through a power-pack, such as described above. Conversely, as the room is exposed to less natural light, the controller unit will vary the control signal applied to the light fixtures to automatically increase the light output from the light fixture or light fixtures to maintain the target light level in the room. Also, if the controlled lights are turned off, then the controller unit can switch the controlled light on through the power-pack. After the controller unit light sensor is set to maintain the target light level for the room in the step 607, in the step 609 a commissioning report can be generated. The commissioning report can include any operational data including, but not limited to, light fixture identification numbers, set-up parameters (e.g., target light level set points), light fixture locations and or performance characteristics (e.g., dimming response data). As described above, the operational data can be downloaded from the portable commissioning device to a personal computer where the commissioning report is formatted and printed.

Figure 6B:
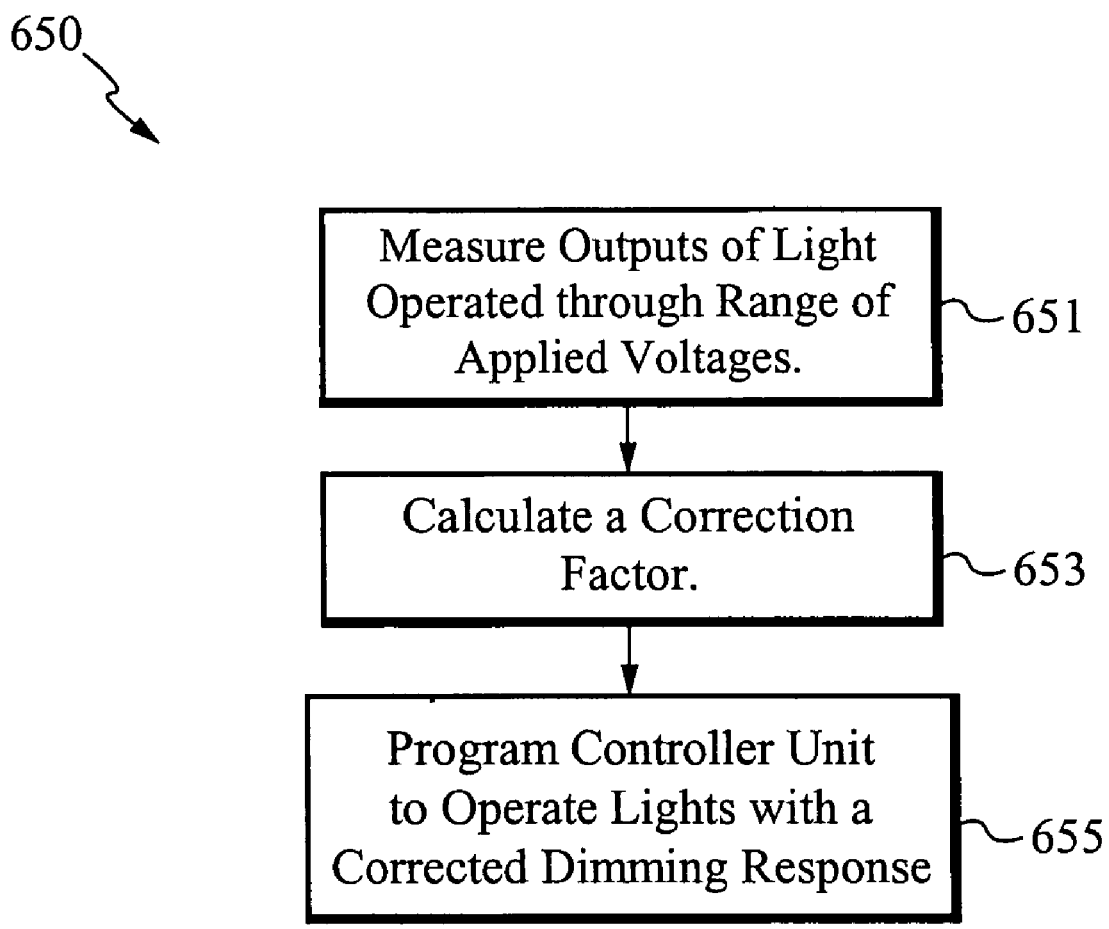

FIG. 6B is block flow diagram 650 outlining steps for calibrating light fixture dimming responses, in accordance with the methods of the present invention. At any time during, after or before executing a commissioning program or commissioning sequence, a calibration program or calibration sequence can be executed. While running the calibration program or calibration sequence in the step 651, the light fixture or group of light fixtures is operated through a range of applied voltages and the corresponding light outputs are measured. Preferably, in the step 651 the light fixtures are operated to full power and are then operated through a range of reduced applied voltages while measuring the corresponding light outputs. The corresponding light outputs can be measured with a commissioning device light sensor, the controller unit light sensor or a combination thereof. From the range of applied voltages and the corresponding light outputs, in the step 653 a dimming response curve and/or a correction factor is calculated. After, the dimming response curve and/or the correction factor is calculated in the step 653, in the step 655 the controller unit is programmed to automatically control the light fixtures in accordance with a corrected dimming response.

The system of the present invention is particularly well suited for commissioning fluorescent light fixtures in large public or private buildings where documentation for the operation of the large number of light fixtures is required. The present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiment chosen for illustration without departing from the spirit and scope of the invention.

What is claimed is:

1. A portable device for commissioning light fixtures to provide target light levels and operate independently of the portable device, the portable device comprising:
   a) means for measuring light values in a work plane of the light fixtures; and
   b) means for communicating, the means for communicating being configured for remotely programming the light fixtures to automatically maintain light outputs at target values based on the light values measured by the means for measuring light values in a work plane, correlated light values measured by controller units coupled to the light fixtures and a calibration factor, wherein the light fixtures automatically maintain the light outputs independently from the means for communicating, and wherein means for communicating initiates a calibration sequence by operating the light fixtures over a range of applied voltages and measures the corresponding light outputs from the light fixtures to determine the calibration factor.

2. The portable device of claim 1, wherein the means for measuring the light values comprises a light sensor configured to measure illumination.

3. The portable device of claim 2, wherein the light sensor comprises one or more light-emitting diodes.

4. The portable device of claim 1, wherein the means for communicating comprises a wireless transceiver.

5. The portable device of claim 4, wherein the wireless transceiver is an infrared transceiver configured to provide two-way communication between the portable device and a controller unit that is electrically coupled to the light fixtures and that includes a compatible infrared transceiver.

6. The portable device of claim 1, further comprising a power source, the power source being selected from the group consisting of a battery and a solar cell.

7. The portable device of claim 1, further comprising a user interface to allow a user to select the target values and initiate programming.

8. The portable device of claim 1, further comprising a micro-processor and a data storage unit for running software to program the light fixtures and for storing program data.

9. The portable device of claim 1, further comprising means to transmit data to a remote host computer.

10. A system for managing light fixtures, the system comprising:
   a) a controller unit coupled to the light fixtures for regulating light outputs from the light fixtures in accordance with a program and room light levels measured by the controller unit, wherein the controller unit comprises a photo-sensor including a photodiode with photopically correcting filters for measuring the room light levels, and further wherein the controller unit is configured to regulate the light outputs based on the measured room light level; and b) a commissioning device configured to remotely program the controller unit to regulate the light outputs according to the program that includes parameters that are determined at least in part based on light levels measured by the commissioning device which are correlated to the light levels measured by the controller unit, wherein controller unit operates according to the program and wherein the commissioning device initiates a calibration sequence by operating the light fixtures over a range of applied voltages and measures the corresponding light outputs from the light fixtures to determine the calibration factor that is used to program the controller.

11. The system of claim 10, wherein the controller unit comprises a micro-computer for running the program and for storing operating data.

12. The system of claim 10, further comprising a wireless communication means, wherein the commissioning device is configured to remotely program the controller unit through the wireless communication means.

13. The system of claim 12, wherein the wireless communication means comprises transceivers coupled to the commissioning device and the controller unit.

14. The system of claim 10, wherein the commissioning device is configured to initiate a calibration sequence, wherein voltage inputs to the light fixtures are compared with light outputs from the light fixtures to determine a correction factor for remotely programming the controller unit.

15. The system of claim 10, further comprising an override device for overriding the controller unit and directly controlling light outputs from the light fixtures.

16. The system of claim 15, wherein the override device is selected from the group consisting of a motion sensor and a manual switch.

17. A method of commissioning light fixtures, the method comprising:

a) selecting a target light level with a portable commissioning device;

b) adjusting a control signal applied to the light fixtures such that light outputs meet the target light level measured with the portable commissioning device; and c) remotely programming a controller unit electrically coupled to the light fixtures with the commissioning device to automatically maintain light outputs to meet the target light level based on a light level measured with the controller unit and light levels measured with the commissioning device and, wherein the light fixtures automatically maintain the light outputs independently from the commissioning device, wherein remotely programming the controller unit comprises initiating a calibration sequence from the portable commissioning device and wherein the portable commissioning device instructs the controller unit to operate the light fixtures over a range of applied voltages and measures the corresponding light outputs to determine a calibration factor.

18. The method of claim 17, wherein adjusting the control signal applied to the light fixtures comprises initiating a commission sequence from the portable commissioning device, whereby the portable commissioning device instructs the controller unit to adjust voltages applied to the light fixtures.

19. The method of claim 17, wherein light outputs are measured with the portable commissioning device using a first light sensor.

20. The method of claim 19, wherein the light level is measured with the controller unit using a second light sensor.

* * * * *